(12) United States Patent
Natarajan et al.

(10) Patent No.: US 10,877,686 B2
(45) Date of Patent: Dec. 29, 2020

(54) MASS STORAGE DEVICE WITH HOST INITIATED BUFFER FLUSHING

(71) Applicant: Intel Corporation, Santa Clara, CA (US)

(72) Inventors: Shankar Natarajan, Folsom, CA (US); Romesh Trivedi, Folsom, CA (US); Suresh Nagarajan, Folsom, CA (US); Sriram Natarajan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 15/953,367

(22) Filed: Apr. 13, 2018

(65) Prior Publication Data

US 2019/0042140 A1    Feb. 7, 2019

(51) Int. Cl.
*G06F 12/00* (2006.01)
*G06F 3/06* (2006.01)

(52) U.S. Cl.
CPC ............ *G06F 3/0652* (2013.01); *G06F 3/061* (2013.01); *G06F 3/068* (2013.01); *G06F 3/0608* (2013.01); *G06F 3/0656* (2013.01); *G06F 3/0659* (2013.01); *G06F 3/0679* (2013.01); *G06F 3/0685* (2013.01)

(58) Field of Classification Search
CPC ... G06F 3/0625; G06F 12/0607; G06F 3/0659
See application file for complete search history.

(56) References Cited

U.S. PATENT DOCUMENTS

| | | | |
|---|---|---|---|
| 2009/0172286 A1* | 7/2009 | Lasser | G06F 12/0804 711/127 |
| 2012/0284544 A1* | 11/2012 | Xian | G06F 12/0804 713/320 |
| 2016/0364337 A1* | 12/2016 | Hale | G06F 3/0673 |
| 2018/0321987 A1* | 11/2018 | Benisty | G06F 9/528 |

* cited by examiner

*Primary Examiner* — Baboucarr Faal
(74) *Attorney, Agent, or Firm* — Compass IP Law PC (57) ABSTRACT

An apparatus is described that includes a solid state drive having non volatile buffer memory and non volatile primary storage memory. The non volatile buffer memory is to store less bits per cell than the non volatile primary storage memory. The solid state drive includes a controller to flush the buffer in response to a buffer flush command received from a host. The controller is to cause the solid state drive to service read/write requests that are newly received from the host in between flushes of smaller portions of the buffer's content that are performed to service the buffer flush command.

20 Claims, 7 Drawing Sheets

Table 301:

| Log Identifier | O/M | Description |
|---|---|---|
| C0h – F1h | | Vendor specific |
| F2h | M | SLC buffer flush completion log |
| F3h – FFh | | Vendor specific |

Table 302:

| Bytes | Description |
|---|---|
| 07:00 | Maximum SLC buffer size (SSLC + DSLC) measured in GB. Note the available DSLC size can change with % capacity |
| 15:08 | Available SLC buffer size (SSLC + DSLC) measured in GB |
| 23:16 | % Completion of SLC buffer eviction, 1 – available SLC buffer size/maximum SLC buffer size |
| 31:24 | SLC buffer data flushed in GB during current operation |
| 39:32 | Cumulative GB of SLC buffer data flushed in total |
| 47:40 | Time elapsed to complete SLC buffer flush in milliseconds |
| 48 | SLC Buffer flush feature status <br> <table><tr><th>Bits</th><th>Definition</th></tr><tr><td>7:5</td><td>Reserved</td></tr><tr><td>4</td><td>If set to 1, the SLC buffer flush initiate command has been interrupted and cancelled by device.</td></tr><tr><td>3</td><td>If set to 1 the SLC buffer flush cancel command has been successfully completed.</td></tr><tr><td>2</td><td>If set to 1 then SLC buffer flush cancel command has been received and FW is executing.</td></tr><tr><td>1</td><td>If set to 1 then SLC buffer flush initiate command has been successfully completed</td></tr><tr><td>0</td><td>If set to 1 then SLC buffer flush initiate command has been received and FW is executing.</td></tr></table> |
| 49 | Number of SLC buffer initiate VU command sent by host |
| 50 | Number of SLC buffer cancel VU command sent by host |
| 51 | Number of SLC buffer initiate interrupted and internally cancelled by SSD |

Callouts: 311, 312, 313, 314, 315, 316, 317, 318, 319, 320, 321, 322, 323, 324

Fig. 4

| Bytes | O/M | Description | | |
|---|---|---|---|---|
| ... | ... | ... | | |
| 3072-3332 | M | Vendor Specific | | |
| 3333 | M | SLC buffer flush | | |
| | | Bits | Definition | |
| | | 7:3 | Reserved | |
| | | 2 | If set to '1' then the drive supports reporting % completion | 603 |
| | | 1 | If set to '1' then the drive supports cancel NVM buffer flush | 602 |
| | | 0 | If set to '1' then the drive supports initiate NVM buffer flush | 601 |
| 4095-3334 | O | Vendor Specific. | | |

Fig. 6

MASS STORAGE DEVICE WITH HOST INITIATED BUFFER FLUSHING

FIELD OF INVENTION

The field of invention pertains generally to the electrical engineering arts, and, more specifically, a mass storage device with host initiated buffer flushing.

BACKGROUND

As computing systems become more and more powerful their storage needs to continue to grow. As a consequence, mass storage devices that can respond to read/write requests with minimal latency while keeping power consumption levels within reasonable limits are highly desired. Unfortunately, high performance and low power consumption are difficult to achieve because the design improvements that result in faster operation, such as a cache-like buffer, also result in little or no time to put the device into a low power sleep mode (because the buffer is flushed to deeper mass storage during device idle time).

FIGURES

A better understanding of the present invention can be obtained from the following detailed description in conjunction with the following drawings, in which.

DETAILED DESCRIPTION

As is known in the art, different flash memory technologies store different numbers of bits per cell. Specifically, a single level cell (SLC) stores one bit per cell, a multiple level cell (MLC) stores two bits per cell, a ternary level cell (TLC) stores three bits per cell and quad level cell (QLC) stores four bits per cell. Whereas an SLC cell is only capable of storing two logic states per cell (a "1" or a "0"), each of the MLC, TLC and QLC cell types, which may be characterized as different types of "multi-bit" storage cells, greatly expand the storage capacity of a flash device because more than two digital states can be stored in a single cell (e.g., four digital states can be stored in an MLC cell, eight digital states can be stored in a TLC cell and sixteen logic states can be stored in a QLC cell).

Here, a particular cell that is capable of storing more than one bit per cell (e.g., any of an MLC cell, TLC cell or QLC cell) can also operate in an SLC mode. That is, because these cells are capable of storing more than one bit per cell, they can easily be used to store only one bit per cell. Generally, each different logic state that a cell can store is realized with a different amount of charge that is stored within the cell. For example, a QLC flash cell is able to store sixteen separately discernable charge amounts in order to physically realize the ability to store four bits at one time. Because a QLC cell is designed to store sixteen different charge levels, it can readily operate in an SLC mode in which it only stores two different charge amounts. Similarly, MLC and TLC cells can also be operated in an SLC mode in which they only store two different charge amounts.

The SLC mode of a multi-bit cell generally has lower write access times than its multi-bit operation. Here, as described in more detail below, the writing activity in SLC mode need not be as precise for multi-bit mode. The lesser precision that is sufficient for SLC mode translates into less time needed to write digital information into the cell as compared to multi-bit write operations. As such, hybrid architecture flash SSDs have been implemented in which some portion of an SSD's multi-bit storage cells are deliberately placed in SLC mode to take advantage of this speed advantage.

Figure 1:
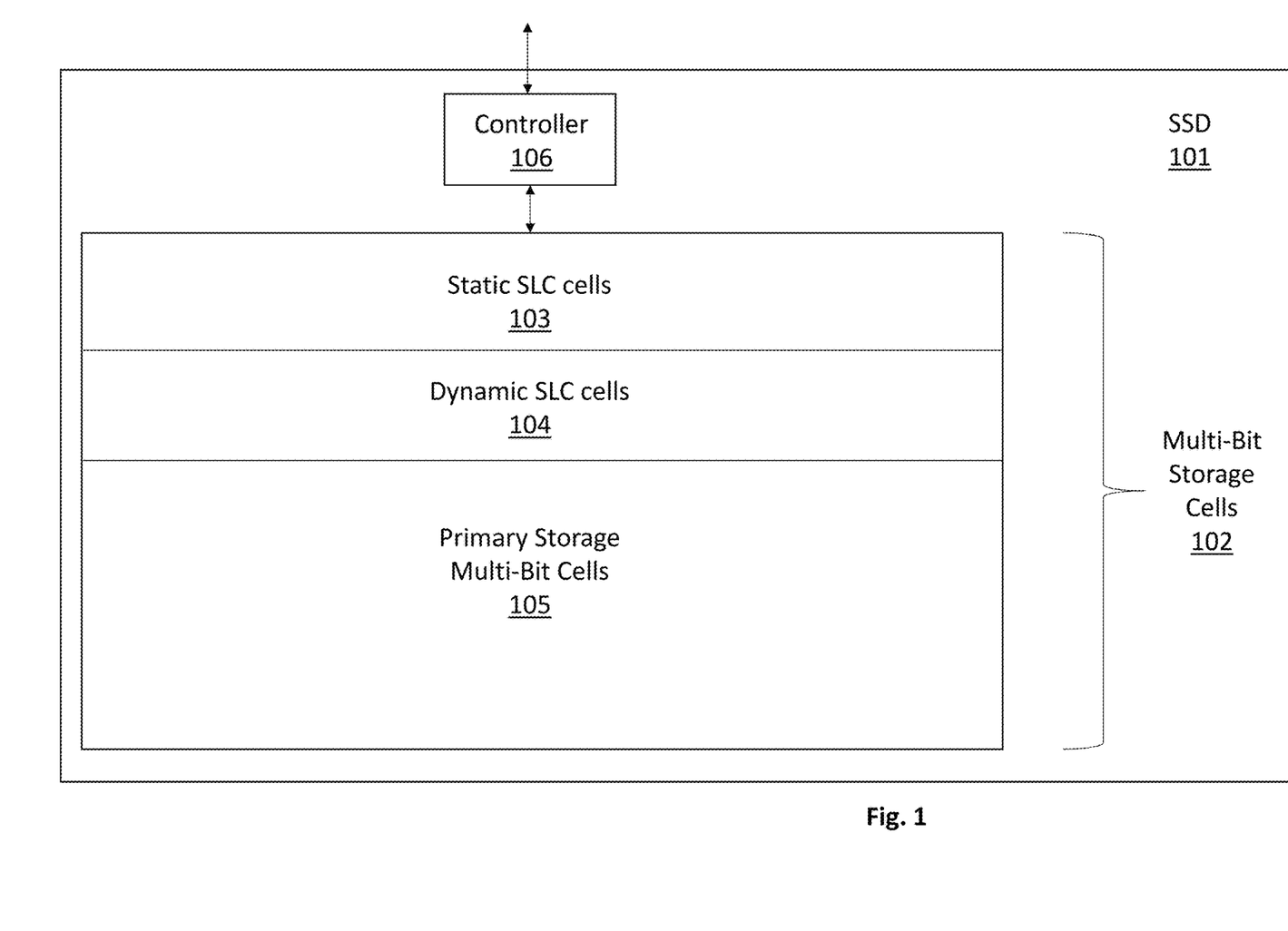
FIG. 1 shows a solid state drive.

FIG. 1 shows an exemplary hybrid SSD 101. As observed in FIG. 1, the SSD 101 is composed of many multi-bit storage cells 102 (which may be realized with a plurality of multi-bit flash semiconductor memory chips). However, the multi-bit storage cells 102 are partitioned into: 1) a first partition of cells 103 that, even though their underlying technology is capable of multi-bit operation (e.g., MLC, TLC, QLC, etc.), are permanently or quasi-permanently placed in an SLC mode of operation; 2) a second partition of cells 104 that initially operates in SLC mode upon SSD bring-up but may, depending on user storage needs, switchover to multi-bit operation; and, 3) a third partition of cells 105 that permanently or quasi-permanently operate in multi-bit mode.

The cells of the first partition 103 and the cells of the second partition 104 when operating in SLC mode are used to implement a "fast cache" or "buffer" that a user of the SSD 101 will observe to possess faster write access times as compared to the write access times of the primary multi-bit storage cells 105. Here, for instance, if the SDD 101 receives a burst of write accesses having effectively random addresses across the burst, the write information is written into cells of the first and/or second partitions 103, 104 that are operating in an SLC mode. By so doing, the write operations are performed more quickly and the host system (e.g., a computer to which the SSD is coupled) enjoys faster performance from the SSD 101 as a whole The two different partitions 103, 104 correspond to two different types of SLC buffers: a static SLC buffer and a dynamic SLC buffer. More specifically, the cells of the first partition 103 correspond to a static SLC buffer and the cells of the second partition 104 correspond to a dynamic SLC buffer. The cells 103 of the static SLC buffer are essentially "extra" storage cells in the SSD (e.g., cells that extend the storage capacity of the SSD 101 beyond its stated capacity). Here, depending on implementation, information that is written into the cells 103 of the static SLC buffer may be subsequently moved to the primary multi-bit storage area 105, e.g., during a background process performed by the SSD controller 106.

In the case of the dynamic SLC buffer, rather than reserve a permanently partitioned extra capacity area of the SSD as is done with the static SLC buffer, instead, an SLC buffer is implemented with cells 104 that can operate in SLC mode to implement a fast cache buffer, or, operate in multi-bit mode as primary storage. Which mode these cells 104 operate in (SLC mode or multi-bit mode) depends on the storage load that is presented to the SSD 101.

More specifically, the cells 104 of the dynamic SLC buffer are initially (e.g., at SSD device boot-up) placed into an SLC mode whereas the cells of the primary multi-bit storage area 105 are placed in their nominal multi-bit mode. However, because the stated maximum storage capacity includes the capacity of the dynamic buffer cells 104 when they are in multi-bit mode (and therefore holding their maximum capacity of data), the cells 104 that are associated with the dynamic buffer will begin to switchover to multi-bit operation once the storage load presented to the SSD approximately compares with the capacity of the primary storage area 105.

When this threshold is reached, any additional new data to be written into the SSD (without overwriting existing data) is written to the cells 104 in the dynamic buffer in multi-bit mode which causes the size of the dynamic SLC buffer to shrink. As the amount of data stored by the SSD 101 wavers above and below this threshold, the cells 104 that are assigned to the dynamic SLC buffer will transition back-and-forth between SLC mode and multi-bit mode. That is, if after surpassing the threshold, the amount of stored data falls below the threshold, any "freed up" dynamic SLC cells (i.e., dynamic cells that were converted to multi-bit mode) can covert back to SLC mode to "recapture" previously lost dynamic SLC buffer size. Thus, the size of the dynamic SLC buffer can shrink and expand depending on the amount of data that the SSD device 101 is storing.

A write back operation, or "flushing", corresponds to the writing of information in a static or dynamic buffer 103, 104 back to the primary multi-bit storage area 105. Flushing can be viewed as a formal commitment ("persistence") of data to the SSD (even though the buffers 103, 104 are also non-volatile). However, after data stored in the static and/or dynamic buffers 103, 104 has been flushed to primary multi-bit storage 105, newly received write requests that target different blocks/pages of data than those stored in the buffers 103, 104 that have been flushed can be written directly over the blocks/pages of data in the buffers 103, 104 that have been flushed. That is, when data in a buffer 103, 104 has been saved in the primary multi-bit storage area 105, the data is formally persisted by the SSD 106 and is free to be written over in a buffer 103, 104 without loss of information to the customer.

A problem, however, is the nominal flush operation of both the static and dynamic buffers 103, 104. Specifically, contents of the static and dynamic buffers 103, 104 are presently written back to the primary multi-bit storage area in response to SSD controller 106 initiation only when the SSD 106 is idle. Thus, if the SSD 106 is highly utilized (receives many read/write requests over a period of time), the SSD 106 is almost never idle and there is little/no opportunity to flush information from the buffers 103, 104 into the primary multi-bit storage area 105.

As such, blocks/pages of data that are not within a buffer 103, 104 must be forcibly written/read to/from the slower primary multi-bit storage area 105. Even if the SSD 106 observes some idle time and flushing operations can be entertained, the flushing operations themselves may consume the entire idle time. As such, the SSD 106 may never exhibit a true low power sleep state. That is, the opportunities when such a low power state might have been possible were spent in a higher power mode writing the buffers' data back to the primary multi-bit storage area 105.

A solution is to interleave flushing activity during the normal active state of the SSD 106 at the command of the host (e.g., from application, operating system (OS) and/or virtual machine (VMM) software that is executing on the host, and/or, from, e.g., from peripheral control hub hardware). That is, the host commands the SSD to introduce flushing operations in between the execution of the SSD's regularly received read and/or write requests from the host.

Figure 2A:
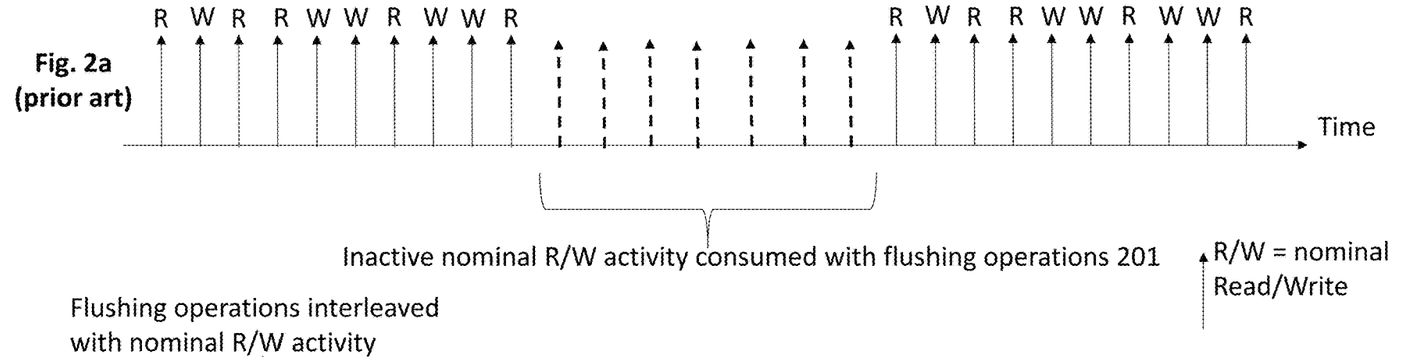
FIGS. 2a and 2b compare prior art with improved flushing characteristics.
Figure 2B:
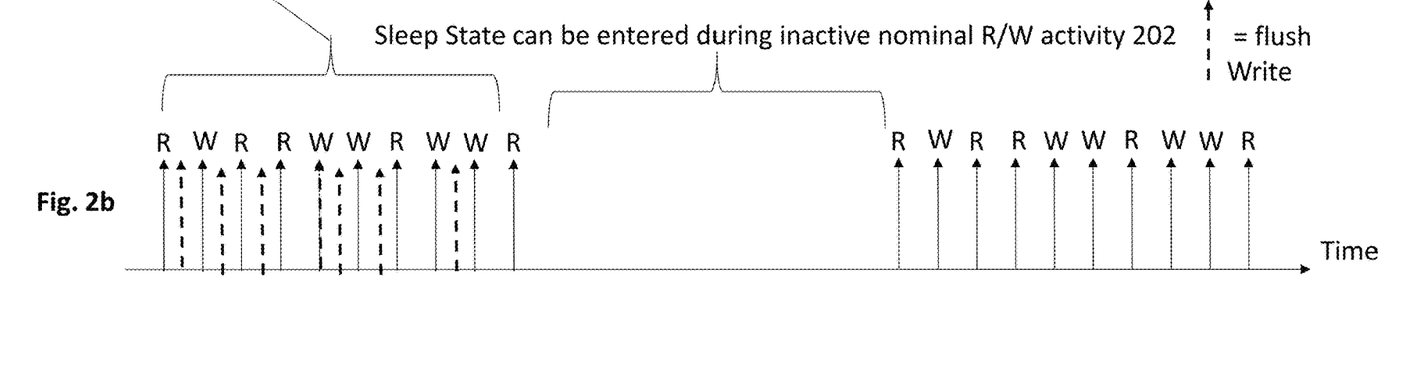

FIGS. 2a and 2b compare the traditional approach with the improved approach. Here, FIG. 2a shows a potential idle time 201 between two time windows of active read/write activity. Notably, flushing operations are not performed during the windows of active read/write activity. As a consequence, the flushing operations must be performed during the inactive time 201 (in response to internal SSD controller command) which prevents the SSD from entering a low power state. By contrast, referring to FIG. 2b, if flushing operations are inserted within the windows of nominal traffic activity the device may be able to observe extended periods of time, such as window 202, when it has no nominal traffic nor flushing activity to service and, as such, can be placed into a low power inactive state.

According to various embodiments, the flushing of the buffers 103, 104 can be initiated by express command from the host. Here, for instance, an application software program, operating system (OS) software program and/or virtual machine monitor (VMM) software program and/or peripheral control hub hardware that the SSD is coupled to may be one of the primary loads that is presently sending the SSD device a significant amount of its read/write activity and/or have direct observance over the stream of read/write activity that is being sent to the SSD. With, e.g., internal knowledge of its own internal processing such software/hardware may recognize moments in time when it does not absolutely need immediate SSD performance and can "slip in" buffer flush commands to the SSD.

That is, more generally, with the host side having a better understanding of its needs/demands of SSD performance, the host side can opportunistically command the SSD to flush its buffers 103, 104. In favorable scenarios, the host application/OS/VMM software and/or hardware is able to slip in enough flush commands amongst a nominal stream of read/write commands such that extended idle times of the SSD will be realized, such as period 202 in FIG. 2b, that enables the SSD to be placed into a low power inactive state. Moreover, with the buffer being regularly flushed or at least partially flushed, the probability that there is no free buffer space over which a new write request can overwrite decreases.

As such, the host is able to issue write requests with continually changing block and/or page address with fewer of these write requests being forced into the primary, slower multi-bit storage 105 because no free buffer space exists. From the perspective of the host this increases the buffer size and/or provides for a greater percentage of write requests being serviced at faster SLC speeds. Further still, the application/OS/VMM can, e.g., intelligently place reads of just written pages/blocks ahead of new writes directed to different pages/blocks in the request stream (data dependency permitting) that is sent to the SSD so that reads also have a greater chance of being serviced from the buffer.

Figure 3:
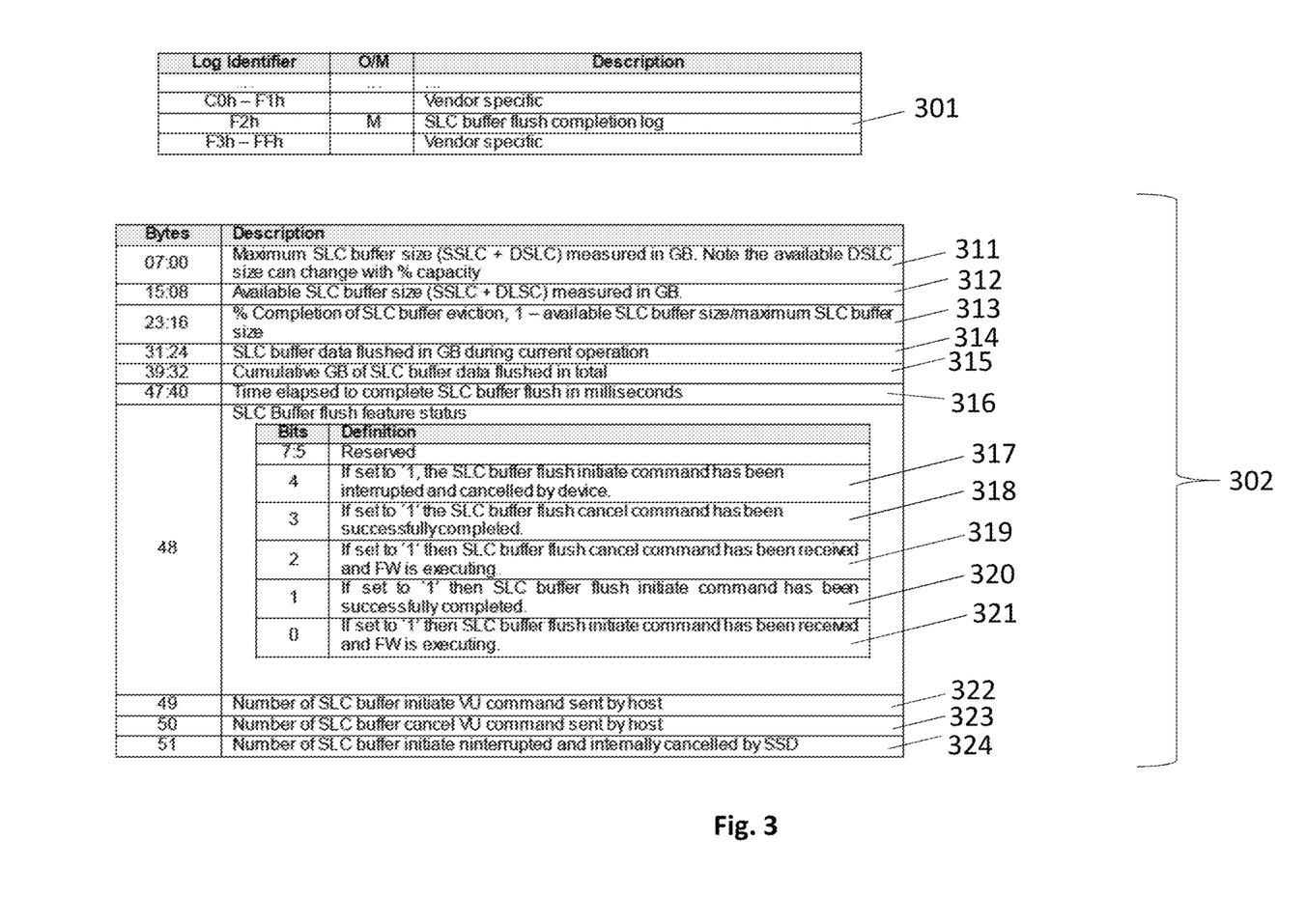
FIG. 3 shows logs that can be maintained by SSD that supports host side initiated flush commands.

FIG. 3 pertains to a mechanism for keeping the host synchronized with an SSD's buffer flushing status. The mechanism of FIG. 3 may be particularly suitable for a Non Volatile Memory Express (NVMe) compatible SSD. As is known in the art, NVMe is an open logical device interface specification for accessing non volatile storage media attached to a Peripheral Component Interconnect Express (PCIe) interface.

Present NVMe specifications outline a number of pages that are kept in the SDD and written to by the SSD as "logs" that record various pertinent events, observations, status, etc. of the SSD over its run time. The pages are accessible to the host which can review the logs to understand the SSD's past or current state or condition.

Present NVMe specifications outline five such logs: 1) Error Information 01h (for recording SSD errors); 2) SMART/health information 02h (for recording issues/events where the SSD is approaching any of a plurality of critical parametric thresholds among other pertinent states/observations of the SSD); 3) Firmware slot information 03h; 4) Vendor Unique SMART CAh—for recording the critical parametric thresholds that are specific to the SSD); and, 5) Command Effects Log (05h). Here, the value following each log type corresponds to the identifier of the log as provided in NVMe.

FIG. 3 presents new suggested logs for the NVMe specification in which event, status or other pertinent features of the of the SSD's flushing activity/capability is recorded by the SSD. According to one embodiment, a first log 301 is used to report to the host when any host initiated flushing of the buffer has been completed (the "SLC buffer flush completion log", hereinafter "completion buffer log") and a second log 302 ("Vendor Specific SLC Buffer Flush", hereinafter, "VS buffer log") is used to define parameters of the SSD's buffer flush capability and current buffer flush status. The VS buffer log 302 provides for different SSD manufacturers to have different buffer flush characteristics. Here, a suggested log identifier for the completion buffer log 301 is F2h and a suggested log identifier for the VS buffer log 302 is F3h.

Either of the logs 301, 302 can be accessed by the host directing a "Get Log Page" command to the SSD that also includes the log identifier for a particular log. In response to its receipt of the Get Log Page command, the SSD will return the requested log (or portion thereof, e.g., if the host only requested specific bytes of the log). The logs 301, 302 may be kept in a reserved area of the SSD's non volatile memory resources (e.g., a partitioned off portion of the storage capacity of the SSD's flash chips or other storage resource of the SSD) or volatile memory that is coupled to the SSD controller, some combination of both, etc.

The buffer flush completion log 301 records timestamps for each completed buffer flush operation that is performed in response to a host initiated buffer flush command. That is, upon the SSD having flushed its static and dynamic buffers in response to a host initiated buffer flush command, the SSD will record a timestamp of the completion in the buffer flush completion log 301.

The VS buffer log 302, in various embodiments, includes the following parameters: 1) the maximum (full) size of the SLC buffer 311 including both static and dynamic components when fully devoted to buffering; 2) available SLC buffer size 312 which specifies the current size of the SLC buffer (which may decrease in size from time to time owing to dedication of the dynamic buffer to primary QLC operation); 3) % complete of the current buffer flush 313 which specifies the amount of data that has been flushed in the current flush operation normalized by the size of the buffer when the current flush operation initiated (other embodiments may normalize by the amount of data in the buffer when the current flush operation initiated); 4) SLC buffer data flushed 314 specifies the total amount of data that has been flushed in the current flush operation; 5) the total amount of data flushed 315 across all flush commands sent to the SSD; 6) time elapsed 316 which records the amount of time required to fully flush the last fully completed flush operation; 7) a set of status bits including: i) a bit 317 to specify if the most recently received flush command has been canceled by the SSD; ii) a bit 318 to specify if the most recently received flush command has been canceled by the host; iii) a bit 319 to specify that, in response to the most recent flush command having been canceled, the SSD is in the process of closing down the flushing operation; iv) a bit 320 to specify when the current flush command has been completed (which causes a timestamp update to the buffer flush completion log); v) a bit 321 to specify that the most recently received flush command is currently being executed (buffer is currently being flushed but has not yet completed flushing); 8) the total number of buffer flush commands 322 sent to the SSD by the host; 9) the total number of buffer flush commands 323 canceled by the host; and, 10) the total number of buffer flush commands 324 sent by the host that were canceled by the SSD.

As can be seen from the contents of the VS flush log 302, various statistics and dynamic event or status changes are communicated between the SSD and the host by way of the log 302.

Figure 4:
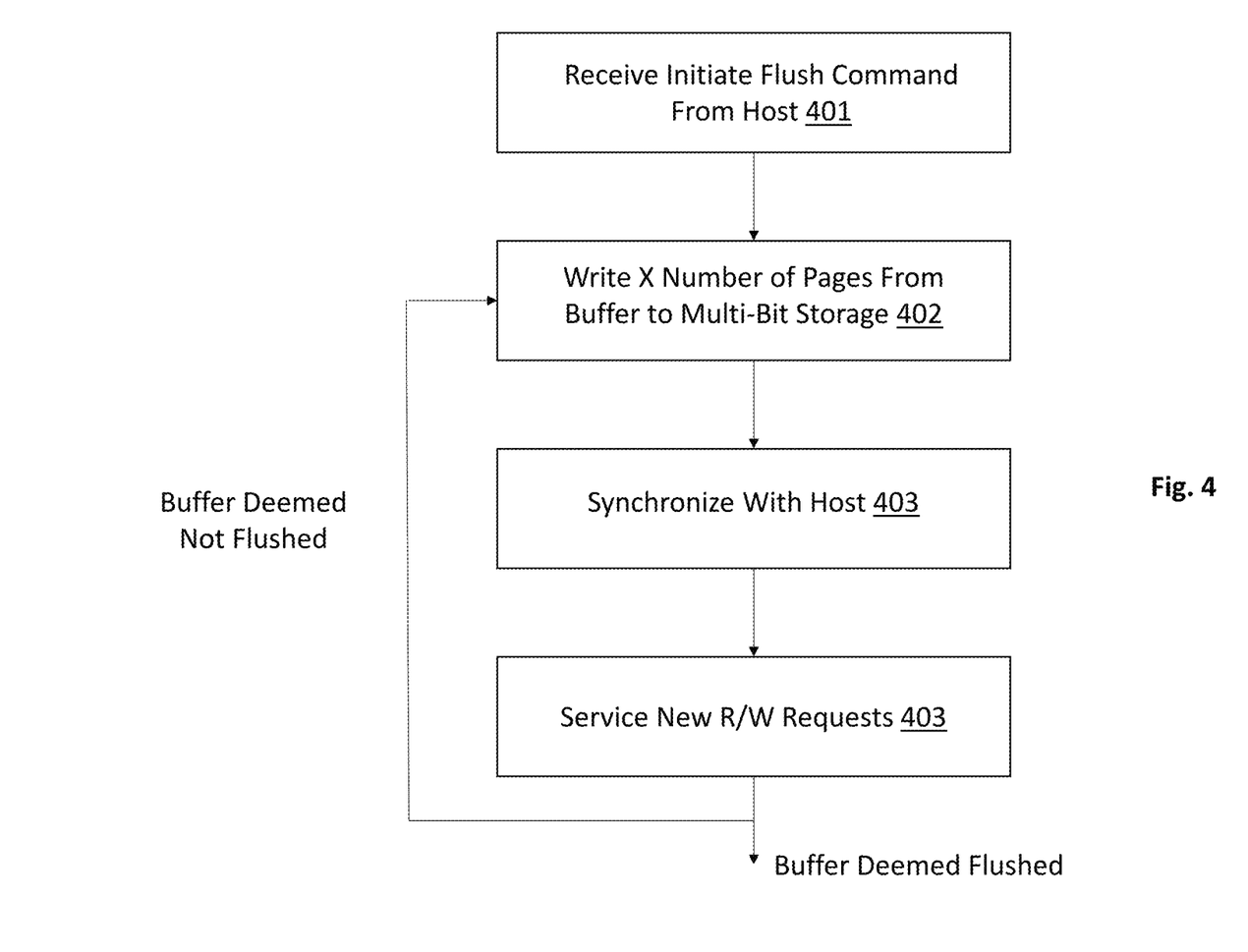
FIG. 4 shows a process for responding to a host side initiated flush command.

FIG. 4 shows a basic SSD methodology for responding to a command sent by the host to flush the buffer's contents (Buffer Flush Initiate command). As observed in FIG. 4, the SSD initially receives a Buffer Flush Initiate command 401. In response to the command, the SSD writes a number (X) of pages of data from the buffer to the primary multi-bit storage area 402. In various embodiments, the number of copied-over pages is less than the number of pages that are stored in the buffer and is a multiple of the number of bits stored per cell in the primary multi-bit storage region 105. For example, if the primary multi-bit storage region 105 is composed of QLC technology that stores four bits per cell, the first flush sequence 402 will copy-over four pages or a multiple of four pages to the primary multi-bit storage area 105.

Here, as is known in the art, each different bit in a same multi-bit cell is commonly reserved for a different page (e.g., Lower (L), Upper (U), Xtra (X) and Top (T) for a QLC cell). By writing a number of pages equal to the number of bits per storage cell in the primary storage area 105, complex internal flash chip signaling needed to activate any particular cell is streamlined so as to, ideally, only activate the particular cell once during a flush operation. Flushing in a single flush sequence a number of pages equal to the number of bits per cell factored by some integer extends this philosophy to more pages worth of flushed data.

Commensurate with the flushing of a specific number X of pages for the first iteration of the overall flush operation, the SSD synchronizes 403 with the host by, e.g., updating appropriate logs. For example, with respect to the VS buffer log 302, the SSD will update the % complete 313 and total flushed data amount 314 entries, start the timer 316 for the current flushing operation, set the bit 321 to indicate the current flush operation is on-going, and increment the total number of flush commands 322 that have been sent to the SSD by the host.

The SSD will also synchronize with the host with respect to other logs that may require updating. For instance, if the SSD observes an internal error, the Error log mentioned above may be updated and/or if a critical threshold of the SSD is being approached (e.g., a total amount of written data, a maximum temperature, a maximum voltage, etc.) the SSD may update the SMART/health log mentioned above. Other synchronizing "checks" that the SSD may go through with each iteration of page flushing is: 1) if the SSD has received some command from the host that imposes modest SSD change (e.g., to set a specific characteristic/feature) then acknowledge the command but delay its execution/implementation until after the flushing is complete; 2) if the SSD has received some command from the host that imposes drastic SSD change (e.g., a new firmware download for the SSD controller, a reformatting of the SSD, a command to initiate comprehensive self testing) then the SSD sends a response to the host that aborts the command.

With the SSD synchronizing with the host 403, the SSD will next service 404 any read/write requests that were received by the SSD during the flushing 402 of the specific number of pages or the synchronizing 403. That is, the SSD temporarily suspends the flushing activity so that it can actually and presently process any read requests or write requests that have been issued to the SSD, e.g., since the commencement of the flush operation. Note that flushing only a specific number X of pages during any iteration 402 and servicing recently received read/write requests with each iteration 404 effectively implements the interleaving of flushing activity 402 with nominal read/write operations 404 as described above with respect to FIG. 2b.

After any newly received read/write requests are serviced 404, the flushing sequence repeats for another iteration of flushing a set number of pages 402, synchronizing 403 with the host and processing 404 any read/write requests that have received since the last iteration. These cycles continue until the buffer space is deemed flushed. In various embodiments, the buffer need not be completely flushed with respect to either or both of the static and dynamic buffers 103, 104. That is, as long as the flushed buffer contents correspond to some high percentage of the buffer contents (e.g., 90%, 95%, etc.) the buffer is deemed to be flushed. In an embodiment, pages from the dynamic SLC buffer are not flushed until all pages in the static SLC buffer has been flushed. In still yet other embodiments the buffer is completely flushed (100% of pages in static and dynamic buffers 103, 104 are written back to primary multi-bit storage). Regardless, note the iterative nature of the interleaving of flushes and servicing new read/write requests can be characterized, at least in some embodiments, as flushing small portions of the buffer's content (e.g., a page count equal to a multiple of the number of bits that can be stored per primary storage cell) in between the servicing of newly received read/write requests.

When the buffer is deemed flushed, a final synchronizing process is performed to update the VS buffer log 302 and the buffer flush completion log 301. In various embodiments this includes setting a bit 320 to indicate the flushing is complete in the VS buffer log 302 and writing the corresponding timestamp in the buffer flush log 301.

Figure 5:
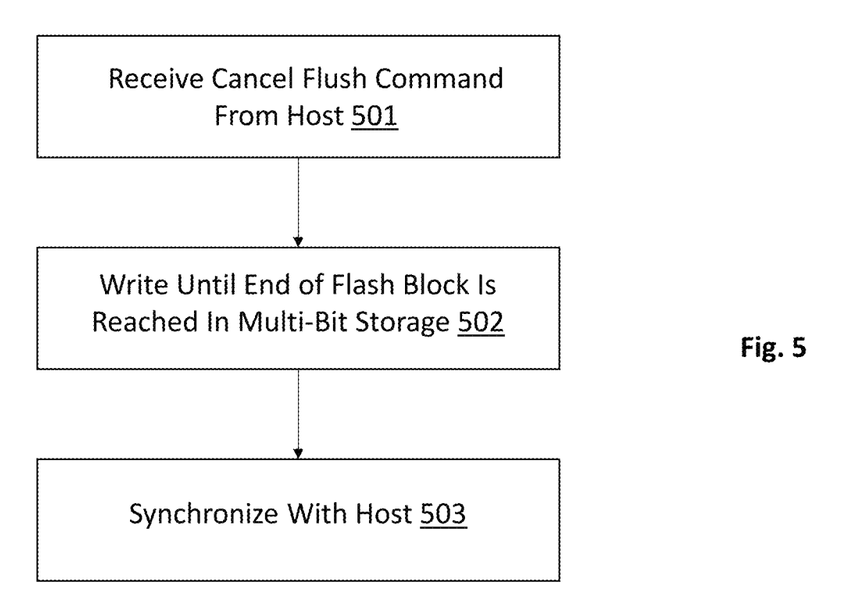
FIG. 5 shows a process for responding to a host side initiated cancel flush command.

FIG. 5 shows another process that is to be performed by the SSD in response to the SSD receiving 501 a command from the host to cancel a current flush operation (Cancel Flush command). In response to receiving such a request, the SSD will continue to write data from the buffer to the multi-bit storage region 105 until the end of a flash block is reached in the multi-bit storage region (additionally, the host cancel received bit 319 of the VS buffer log 302 is set and the total host cancel counter 323 of the VS buffer log 302 is incremented). Here, assuming there are multiple flash pages per flash block, the end of flash block should be reached at an end of page boundary. Possibly, less than X pages will be written during closure of the flushing process as compared to the standard X pages that are written 402 during a flushing iteration. After the end of flash block is reached in the multi-bit storage region 105, the SSD synchronizes with the host by updating log 302. Here, specifically, bit 318 of the VS buffer log 302 is set to indicate the flush cancellation has been successfully completed. The buffer completion log 301 may also be updated to reflect completion of whatever amount of flushing activity was performed prior to shutdown of the flush operation.

Here, again with application, OS and/or VMM software (and/or underlying hardware) being aware of the read/write request streams being prepared for sending to the SSD or having been sent to the SSD for processing, such software/hardware may, e.g., recognize that a number of such newer/upcoming reads/writes are directed to pages/blocks that are already in the SSD's buffer space and, therefore, cancel any current flushing activity because free buffer space is not needed for these newer, upcoming requests.

Figure 6:
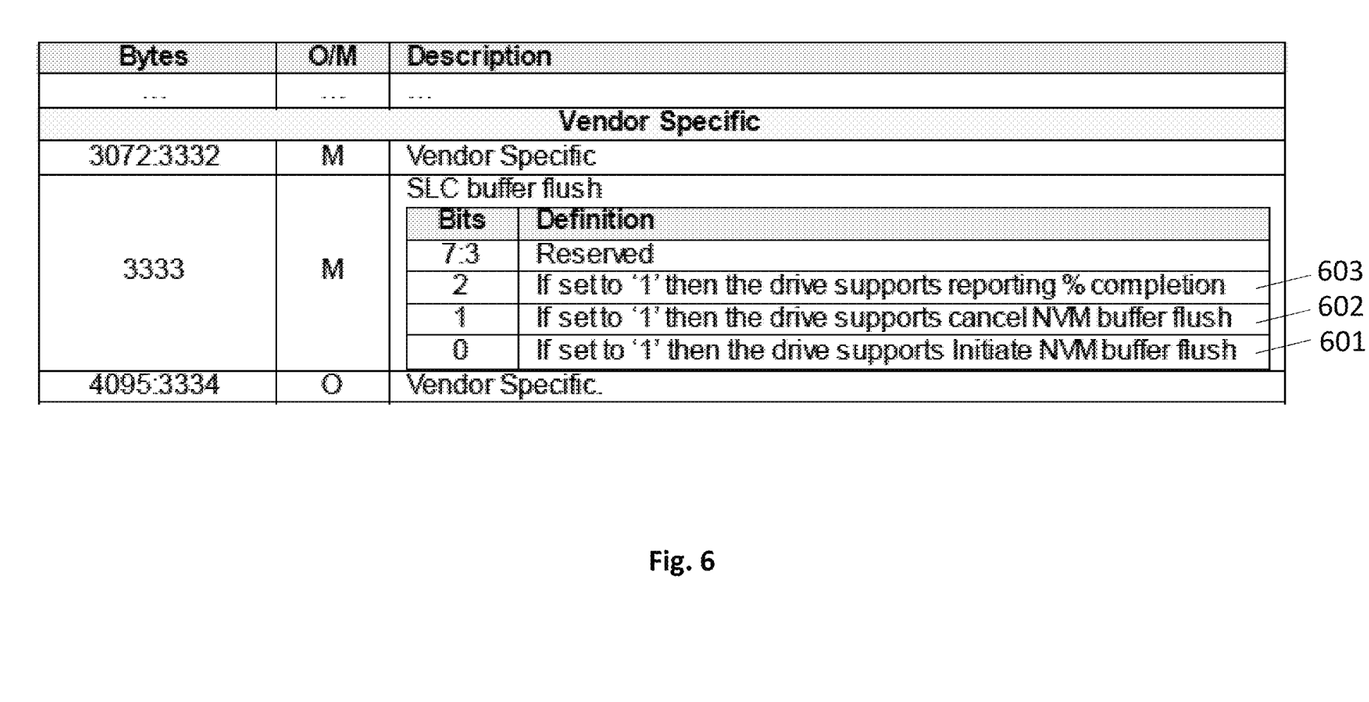
FIG. 6 shows an exemplary SSD identity data structure.

The NVMe specification also supports firmware data structures that permit an SSD to identify itself and the various tasks/functions (such as host initiated flush commands) that it can perform. FIG. 6 shows a proposed modification to the NVMe specification that defines SSD identity data structure information to include a first bit 601 that specifies whether the SSD supports host initiated buffer flushing embodiments of which have been described at length above, a second bit 602 that specifies (if the SSD supports host initiated flush commands) if the SSD supports host initiated cancellation of current host initiated flushing and a third bit 603 that indicates whether the SSD supports reporting of the % complete information 313 in the VS buffer log 302.

Referring back to FIG. 1, the improved functionality of responding to and implementing host initiated buffer flushing as described at length above, in various embodiments, is principally overseen by the controller 106 of the SSD. The controller 106 may be implemented with logic circuitry that is designed to execute some form of (e.g., firmware (FW)) program code (e.g., a micro-controller, an embedded processor, etc.), custom hardwired logic circuitry or programmable logic circuitry (e.g., an FPGA or PLD) or any combination thereof. Also, to the extent other non volatile memory technologies besides flash may store more than one bit per cell but exhibit slower response times than when exhibiting single bit per cell storage, the teachings herein can be extended to SSDs that include such non volatile memory technologies. Such alternative technologies might include memory technologies having storage cells composed of chalcogenide, resistive memories (RRAM), Ferro-electric memories (FeRAM), magnetic memories (MRAM), etc.

Finally, note that the teachings above can be applied to an SSD that only includes a static SLC buffer or only includes a dynamic SLC buffer, or, includes a multi-bit per cell buffer whose number of bits stored per cell is less than the cells of the primary storage area 105. Here, the fewer stored bits per cell the faster the cell, thus although embodiments above stressed single bit per cell for the buffer, the teachings herein do not preclude embodiments where more than one bit is stored per cell in the buffer space (e.g., buffer space stores MLC but primary storage is QLC).

Figure 7:
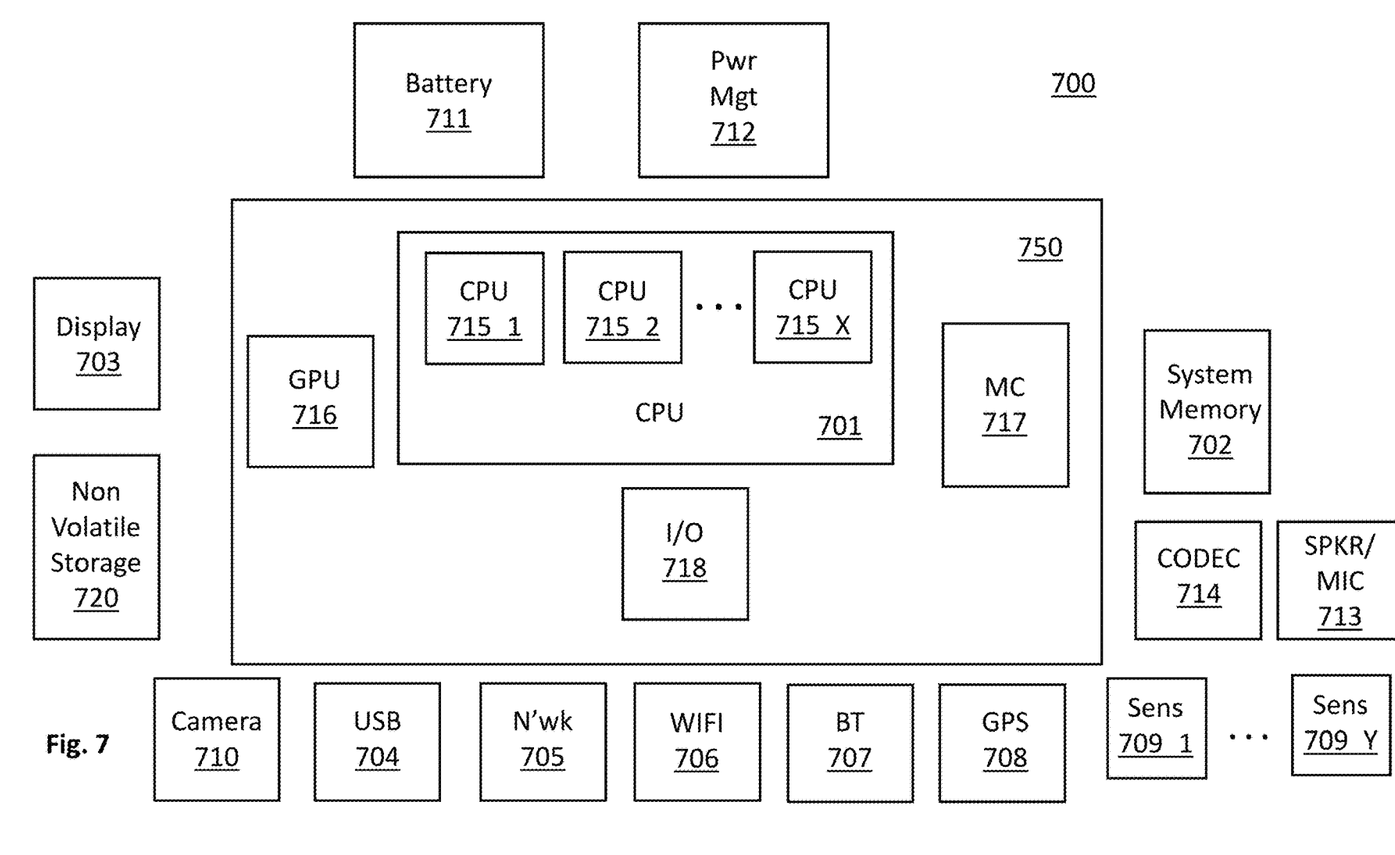
FIG. 7 shows an exemplary computing system.

FIG. 7 provides an exemplary depiction of a computing system 700 (e.g., a smartphone, a tablet computer, a laptop computer, a desktop computer, a server computer, etc.). As observed in FIG. 7, the basic computing system 700 may include a central processing unit 701 (which may include, e.g., a plurality of general purpose processing cores 715_1 through 715_X) and a main memory controller 717 disposed on a multi-core processor or applications processor, system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing unit 716 typically executes graphics intensive functions to, e.g., generate graphics information that is presented on the display 703. The memory control function 717 interfaces with the system memory 702 to write/read data to/from system memory 702. The power management control unit 712 generally controls the power consumption of the system 700.

Each of the touchscreen display 703, the communication interfaces 704-707, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750.

The computing system also includes non-volatile storage 720 which may be the mass storage component of the system. Here, for example, one or more SSDs having host side initiated flush command capability may be coupled to the peripheral control hub 718 either directly, or, e.g., through a network (e.g., a storage network, a local area network, etc.).

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a solid state drive comprising non volatile buffer memory and non volatile primary storage memory, said non volatile buffer memory to store less bits per cell than said non volatile primary storage memory, said solid state drive comprising a controller to flush said non volatile buffer memory in response to a buffer flush command received from a host, said controller to cause said solid state drive to service read/write requests that are newly received from said host in between flushes of smaller portions of content of said non volatile buffer memory, said flushes of said smaller portions of said content of said non volatile buffer memory being performed to service said buffer flush command so that said controller interleaves said flushes of said smaller portions of said content of said non volatile buffer memory with respective nominal services of said read/write requests thereby creating an idle time in said solid state drive in which said solid state drive is not servicing said read/write requests or performing said flushes of said smaller portions of said content of said non volatile buffer memory so that said solid state drive is able to enter a low power state within said idle time.

2. The apparatus of claim 1 wherein said non volatile buffer memory and said non volatile primary storage memory are composed of flash storage cells.

3. The apparatus of claim 2 wherein said non volatile buffer memory is composed of single level cell (SLC) flash storage cells.

4. The apparatus of claim 3 wherein said non volatile primary storage memory is composed of quad level cell (QLC) storage cells.

5. The apparatus of claim 1 wherein said non volatile buffer memory is composed of a static buffer memory and a dynamic buffer memory.

6. The apparatus of claim 5 wherein said static buffer memory and said dynamic buffer memory are both composed of SLC flash storage cells.

7. The apparatus of claim 1 wherein said solid state drive comprises a NVM express (NVMe) interface through which said buffer flush command is received from said host.

8. The apparatus of claim 1 wherein said controller is to cause said solid state drive to cease further flushing of said non volatile buffer memory in response to a cancel flush command received from said host.

9. The apparatus of claim 1 wherein said controller is to update a log to indicate completion of said buffer flush command.

10. The apparatus of claim 1 wherein said smaller portions are determined as a number of pages equal to a multiple of a number of bits that are stored per storage cell of said non volatile primary storage memory.

11. An apparatus, comprising:
a semiconductor chip comprising host side logic circuitry to send a stream of read/write requests to a solid state drive and to insert a buffer flush command to said solid state drive within said stream of read/write requests, wherein, in response to said buffer flush command being inserted within said stream of read/write requests, said solid state drive will interleave servicing of nominal read/write activity of the solid state drive with flushes of smaller portions of a non volatile buffer memory to a non volatile primary storage memory, wherein, the interleaving of the servicing of the nominal read/write activity of the solid state drive with the flushing of the smaller portions of the non volatile buffer memory to the non volatile primary storage memory is to create an idle time in the solid state drive in which the solid state drive is not servicing read/write requests from the host or performing flushes so that the solid state drive is able to enter a low power state.

12. The apparatus of claim 11 wherein said host side logic circuitry is part of a peripheral control hub.

13. The apparatus of claim 12 wherein said peripheral control is to communicate to said solid state drive through an NVM express (NVMe) interface.

14. A computing system, comprising:
a plurality of processing cores;
a main memory;
a main memory controller coupled between said main memory and said plurality of processing cores; and,
a peripheral control hub coupled to a solid state drive, solid state drive comprising non volatile buffer memory and non volatile primary storage memory, said non volatile buffer memory to store less bits per cell than said non volatile primary storage memory, said solid state drive comprising a controller to flush said non volatile buffer memory in response to a buffer flush command received from a host, said controller to cause said solid state drive to service read/write requests that are newly received from said host in between flushes of smaller portions of content of said non volatile buffer memory, said flushes of said smaller portions of said content of said non volatile buffer memory being performed to service said buffer flush command so that said controller interleaves said flushes of said smaller portions of said content of said non volatile buffer memory with respective nominal services of said read/write requests thereby creating an idle time in said solid state drive in which said solid state drive is not servicing said read/write requests or performing said flushes of said smaller portions of said content of said non volatile buffer memory so that said solid state drive is able to enter a low power state within said idle time.

15. The computing system of claim 14 wherein said solid state drive comprises an NVM express (NVMe) interface through which said buffer flush command is received from said host.

16. The computing system of claim 14 wherein said controller is to cause said solid state drive to cease further flushing of said buffer in response to a cancel flush command received from said host.

17. The computing system of claim 14 wherein said controller is to update a log to indicate completion of said buffer flush command.

18. The computing system of claim 14 wherein said smaller portions are determined as a number of pages equal to a multiple of a number of bits that are stored per storage cell of said non volatile primary storage memory.

19. The computing system of claim 14 wherein said non volatile buffer memory is composed of single level cell (SLC) flash cells and said non volatile primary storage memory is composed of flash cells that store more than one bit per cell.

20. A method performed by a solid state drive, comprising:
receiving a buffer flush command from a host;
receiving read/write requests from said host; and,
flushing smaller portions of content from a buffer of said solid state drive in between respective services of said read/write requests such that said flushing of said smaller portions is interleaved with said services of said read/write requests, said interleaving of said smaller portions with said services of said read/write requests to create an idle time in the solid state drive in which said solid state drive is not performing reads, not performing writes and not performing flushes from said buffer so that said solid state drive is able to enter a low power state within said idle time.

* * * * *